United States Patent [19]

Ramos

[11] Patent Number: 5,501,496
[45] Date of Patent: Mar. 26, 1996

[54] WIRE MESH PULLER

[76] Inventor: Robert S. Ramos, P.O. Box 651, Keys, Calif. 95326

[21] Appl. No.: 555,234

[22] Filed: Jul. 20, 1990

[51] Int. Cl.⁶ ..................................................... B65G 7/12
[52] U.S. Cl. ................................................ 294/26; 294/15
[58] Field of Search ..................... 294/9, 12, 14, 294/15, 17–19.1, 22, 24, 26, 89, 25, 57; 16/110 R, DIG. 12, 111 R, 114 R, 118; 52/122.1, 125.2, 749, DIG. 1; 254/120, 131; 15/143 R, 145

[56] References Cited

U.S. PATENT DOCUMENTS

| | | | |
|---|---|---|---|
| 673,830 | 5/1901 | Wade | 294/26 |
| 896,714 | 8/1908 | Donoughe | 294/26 |
| 1,311,618 | 7/1919 | Penn | 294/26 |
| 2,488,312 | 11/1949 | Millican et al. | 294/26 |
| 3,203,606 | 8/1965 | Masterson | 294/15 X |
| 3,232,355 | 2/1966 | Woolworth | 294/57 X |
| 3,282,619 | 11/1966 | Loosemore | 294/15 |
| 3,642,251 | 2/1972 | Niederholtmeyer | 294/15 X |
| 4,098,442 | 7/1978 | Moore | 294/26 X |
| 4,149,743 | 4/1979 | Becnel | 294/26 |
| 4,242,928 | 1/1981 | Haley et al. | 294/26 X |
| 4,258,948 | 3/1981 | Hoffmann | 294/26 X |
| 4,691,465 | 9/1987 | Dooley | 294/26 X |

FOREIGN PATENT DOCUMENTS

| | | | |
|---|---|---|---|
| 78128 | 9/1919 | Austria | 16/114 R |
| 2627279 | 12/1977 | Germany | 294/26 |
| 2742925 | 4/1979 | Germany | 294/57 |
| 2201115 | 8/1988 | United Kingdom | 294/26 |

*Primary Examiner*—Johnny D. Cherry

[57] ABSTRACT

A hand tool for lifting wire mesh during the pouring of concrete slabs has an elongated rigid shank with a depending tooth at one end and a handle at the other end that is parallel to the tooth, and which extends somewhat above the shank so that one gripping the handle may place the index finger above the shank to provide the tool as an extension of the arm of the user.

4 Claims, 1 Drawing Sheet

U.S. Patent    Mar. 26, 1996    5,501,496
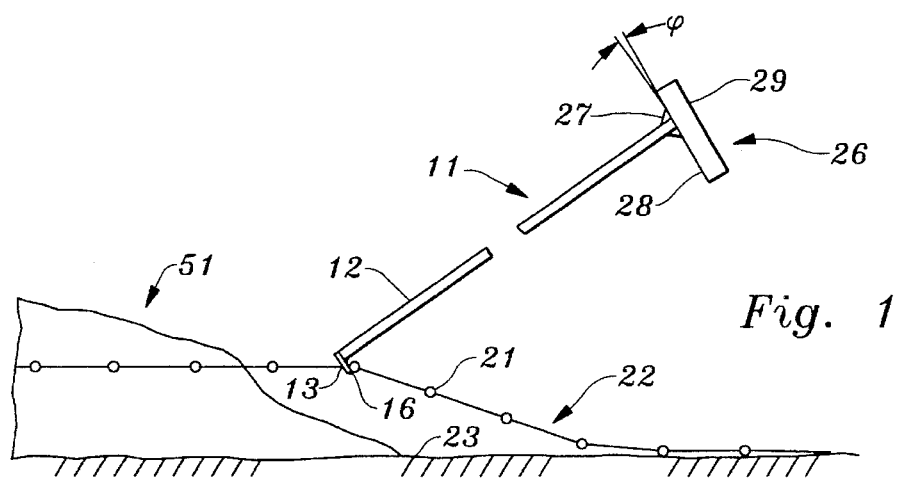
Fig. 1
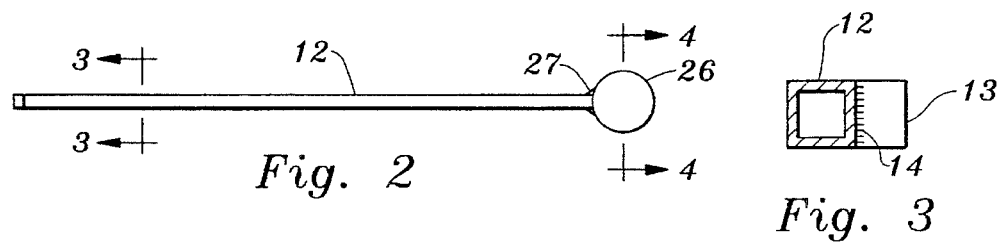
Fig. 2
Fig. 3
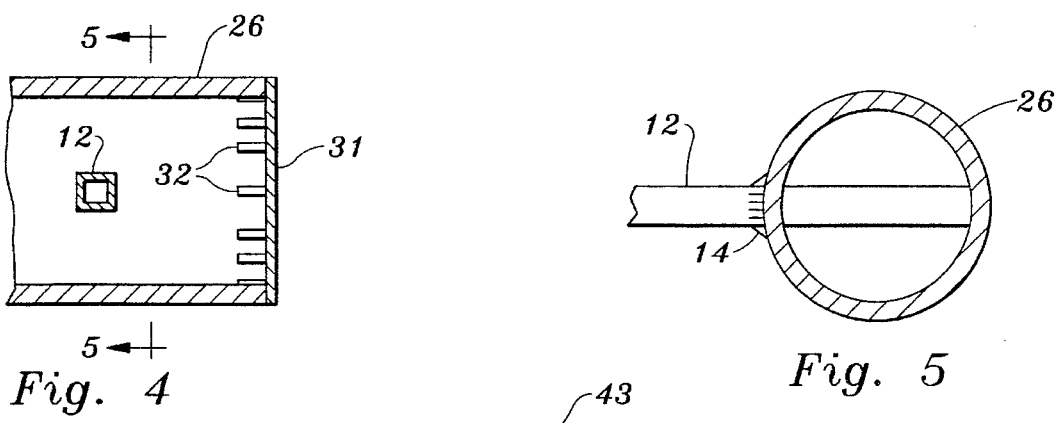
Fig. 4
Fig. 5
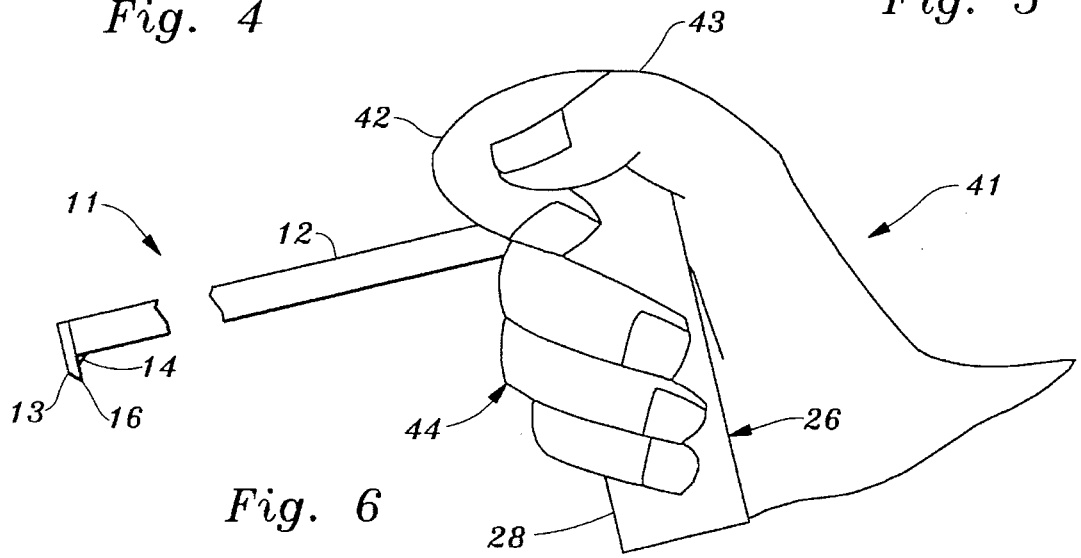
Fig. 6

WIRE MESH PULLER

BACKGROUND OF THE INVENTION

In the pouring of concrete slabs, as for the floor of a building or the like, there is commonly employed a wire mesh that is initially laid on the ground and then lifted as wet concrete is poured thereover so that the mesh lies somewhere near the middle of the slab depth and is completely encompassed by concrete. This mesh then strengthens the concrete, and at least many building codes require the use of wire mesh and the proper placement of same in the wet concrete.

Conventionally, wire mesh is lifted by hand or possibly by use of a claw hammer as wet concrete is poured over the mesh. This lifting is necessary to locate the mesh within the concrete slab rather than merely underlying the slab. Lifting the mesh by hand is a back breaking job inasmuch as a concrete worker must continuously stoop over to grasp the mesh. Some workers have bent a piece of rebar so that they can stand up and pull wire mesh upwardly during pouring of concrete by catching the bent end under the mesh, and pulling upward as concrete is poured over the mesh. This is at most a clumsy arrangement and often the bent end of the rebar rod is not easily released from the mesh.

The present invention provides a hand tool for lifting or pulling wire mesh upwardly during concrete pouring to materially facilitate the job.

SUMMARY OF INVENTION

The hand tool of the present invention employs a rigid elongated member or shank having a short tapered lateral extension or tooth at one end and a handle or hand grip at the other end. The handle is parallel to the lateral extension and extends partially above the shank with the main portion extending below the shank. The handle is rigidly connected to the elongated member or shank in substantially perpendicular relation thereto or angled with the main portion offset from perpendicular toward the opposite end of the elongated member.

The tool of this invention may be formed of any rigid material such as steel or hard plastic. A metal embodiment of the invention may comprise the main parts such as an elongated square tube welded at one end to a metal tube forming the handle and a metal tooth or extension welded to the opposite end of the square tube.

The orientation of handle and tooth or lateral extension is important in providing the capability of rotating or turning the tool or puller to free the tooth from beneath a wire mesh. Also, the orientation of the handle with respect to the elongated member is important in providing for gripping of the handle by a hand with the index finger above the shank and the rest of the hand below such member. With this structure the tool becomes an extension of the arm of a user so as to require a minimum of effort to use the tool both in pulling wire mesh upwardly and in releasing the tool from the mesh as concrete is being poured over the mesh.

BRIEF DESCRIPTION OF DRAWINGS

The present invention is illustrated with respect to a preferred embodiment in the accompanying drawings, wherein:

FIG. 1 is a side view of the invention during use thereof;

FIG. 2 is a plan view of the tool of FIG. 1;

FIG. 3 is a sectional view taken in the plane 3—3 of FIG. 2;

FIG. 4 is a sectional view taken in the plane 4—4 of FIG. 2;

FIG. 5 is a sectional view taken in the plane 5—5 of FIG. 4; and

FIG. 6 is an illustration of gripping of the tool of the present invention.

DESCRIPTION OF PREFERRED EMBODIMENT

The wire mesh puller of the present invention may be formed of any sturdy rigid material such as metal or plastic, and the illustrated embodiment is formed of metal. Referring now to the drawings, it will be seen that the puller 11 includes an elongated rigid shank 12 which may be comprised as a square metal tube as shown, for example, in FIG. 3 of the drawings. At the lower or outer end of the shank 12, there is provided a short lateral extension or tooth 13 secured perpendicular to the shank across the outer end of the shank 12 as by welding 14 and having the outer or underside thereof tapered upwardly to an edge The tooth 13 extends downwardly from the shank 12 only a distance sufficient to readily fit under a wire 21 of a wire mesh 22, as further described below. Such extension may, for example, be about one quarter to one half of an inch.

At the upper end of the shank 12, there is provided a handle 26 that may be formed of a short section of cylindrical steel tubing having a diameter of about one inch (1"). The handle 26 is secured to the upper end Of the shank as by a weld 27, adjacent to, but short of the upper end of the handle. In practice, the connection of handle and shank may be accomplished by extending the shank through a hole in one side of the handle into contact with the other side interiorly of the handle, as illustrated, in FIG. 5 of the drawings, for maximum strength of handle and shank.

The handle 26 is attached to the shank 12 in parallel with the tooth 13 with a major portion 28 of the handle extending below the shank and a short upper portion 29 of the handle extending above the shank. As an example, the handle 26 may have a length of about five inches (5") with the upper portion 29 extending about three quarters of an inch (¾) to one inch (1") above the shank 12. With the shank having a cross-sectional dimension of about one-half inch (½), the lower portion 28 of the handle would then depend about three and one-half inch, (3½") to three and three quarters inches (3¾") from the shank. In addition to the above-noted orientation of handle and shank, the handle is mounted perpendicularly to the shank, or preferably at a slight angle thereto with the lower portion of the handle tilted slightly toward the outer toothed end of the shank. This tilting of the handle with respect to the shank is shown in somewhat exagerated form in FIG. 1 of the drawings wherein it will be seen that the handle is at an angle θ to perpendicular to the shank 12. This slight inclination to perpendicular has been found to be advantageous in use reducing the effort required to use the tool of the present invention.

The handle 26 may be closed at opposite ends by small caps 31 formed of metal or plastic, and having means such as a circular flange or interior teeth 32 for gripping the interior of the handle when the caps are snapped into place.

Considering now the use of the present invention, and referring particularly to FIGS. 1 and 6, it will be seen that the tool is adapted to be grasped at the handle 26 by a hand 41 of the user, The handle 26 is gripped by placing the index finger 42 about the upper portion 29 of the handle above the shank with the thumb 43 about the opposite side of this upper portion of the handle. The remaining fingers 44 are curled about the lower portion 28 of the handle so that the handle is firmly grasped by the hand 41 of a user.

The tool hereof is intended to be employed with the shank 12 11 thereof extending generally in line with the forearm of a person grasping the tool with such arm being inclined downwardly so that the tooth is disposed at about ground level with the user standing upright. To this end, the tool of the present invention may be, and preferably is, provided in different lengths such as thirty inches (30"), thirty-three inches (33"), and thirty-six inches (36"), to accommodate usage by persons of different heights.

The tool hereof is employed by placing the tooth 13 beneath a wire 21 of a wire mesh 22 lying upon the ground, and drawing the tool upwardly to pull the mesh up above a ground level 23 as shown in FIG. 1. This pulling of the mesh upwardly is accomplished immediately ahead of the pouring of wet concrete 51. By raising the wire mesh, it will then be imbedded within the concrete 51 above ground level so as to provide the reinforcing strength intended of the mesh.

Concrete is commonly poured from a concrete truck through a spout that may be swung back and forth to rapidly cover the ground to a desired depth, and thus the tool of the invention must be repeatedly employed to raise successive portions of the wire mesh, as the concrete is being poured. This then calls for the tool to be readily released from the mesh, and such is herein accomplished by rotating the tool by hand pressure on the handle 26 so as to swing the tooth 13 out from under the wire that it is engaging to raise the mesh. It is not necessary to push the tool into the wet concrete, but instead it is only necessary to rotate the tool to free same from the wire mesh so that the tool may again be used to raise a next portion of the mesh, as concrete pouring continues.

It has been found that the handle 26 should be substantially perpendicular to the shank 12, and may advantageously be slightly tilted with respect to the shank to place the lower end of the handle closer to the tooth end of the shank, as illustrated in FIG. 1. This facilitates use of the tool and reduces the strain on the hand and arm of the user. The handle may be preferably tilted from perpendicular by about two or three degrees.

The present invention has been described above with respect to a particular preferred embodiment thereof, however, it will be appreciated by those skilled in the art that modifications and variations are possible within the scope of the present invention, and thus it is not intended to limit the invention by illustration of particular materials or dimensions.

What is claimed is:

1. A wire mesh puller comprising an elongated rigid shank having an upper and a lower side, a substantially straight tooth depending laterally from the lower side of said shank at an outer end thereof, and a handle attached to an inner end of said shank in substantially perpendicular relation thereto and substantially parallel relation to said tooth and having a major portion depending from the lower side of said shank and a minor portion extending above the upper side of said shank sufficient to accommodate gripping by the index finger of a hand having the remaining fingers thereof disposed about said handle below said shank.

2. The puller of claim 1 further defined by said handle being disposed at a small angle of the order of two to three degrees perpendicular to said shank with the major portion of the handle tilted toward said tooth.

3. The puller of claim 1 further defined by said shank being formed of a metal tube, said handle being formed of a metal tube welded to an upper end of said shank, and said tooth being formed of a metal plate welded to a lower end of said shank and having the under side beveled upwardly away from said shank.

4. The wire mesh puller of claim 1 further defined by said handle having a total length sufficient for gripping by the hand of the user and said minor portion extending above the upper side of said shank a distance substantially equal to the width of an index finger of the hand of user, whereby the handle of the tool is adapted to be gripped by hand with the index finger thereof the shank to provide manual control over raising, lowering and rotating of the tool for engagement, manipulation and release of wire mesh.

* * * * *